United States Patent

[11] 3,568,886

| [72] | Inventor | John L. Christmann<br>Passaic, N.J. |
|---|---|---|
| [21] | Appl. No. | 808,265 |
| [22] | Filed | Mar. 18, 1969 |
| [45] | Patented | Mar. 9, 1971 |
| [73] | Assignee | Merrick Scale Mfg. Company<br>Passaic, N.J. |

[54] LOW CAPACITY WEIGHER AND FEEDER
14 Claims, 7 Drawing Figs.

[52] U.S. Cl. .................................................. 222/55,
198/213, 222/56, 222/236, 222/252, 222/413
[51] Int. Cl. ........................................................ B67d 5/08
[50] Field of Search .......................................... 51/164;
198/9, 99, 213; 222/52, 55, 56, 252, 411, 413,
238, 241, 236

[56] References Cited
UNITED STATES PATENTS

| 491,064 | 1/1893 | Nichols ........................ | 222/252X |
| 1,022,305 | 4/1912 | Dean ........................... | 222/252X |
| 2,533,852 | 12/1950 | Tietig .......................... | 222/56X |
| 2,889,077 | 6/1959 | Cunningham ................ | 222/55X |
| 2,900,110 | 8/1959 | Coffman, Jr. et al. ........ | 222/55 |
| 3,107,819 | 10/1963 | Black et al. ................ | 222/55 |
| 3,253,745 | 5/1966 | Skelton ........................ | 222/56 |
| 3,318,438 | 5/1967 | Neebel et al. ................. | 222/413X |
| 3,301,442 | 1/1967 | Schwertfege et al .......... | 222/252 |

*Primary Examiner*—Joseph R. Leclair
*Assistant Examiner*—Steven E. Lipman
*Attorney*—John A. Seifert

ABSTRACT: A low capacity weigher and feeder for handling capacities from 100 pounds per hour to a fraction of a pound per hour comprising a bin discharging material into a screw prefeeder or conveyor inclining to and transferring the material into a rotating drum declining from the transfer end of the screw conveyor and supported by a beam fulcrumed at the point of transfer between the screw conveyor and the drum and connected to a low capacity strain gauge for controlling the rate of feed and integrating the weight of said material. Both the screw conveyor and the drum are rotated by separate variable speed motors which are regulated by the strain gauge and a pulser wheel with its pickup coil.

INVENTOR.
JOHN L. CHRISTMANN

INVENTOR.
JOHN L. CHRISTMANN
BY
John A. Seifert
ATTORNEY

INVENTOR.
JOHN L. CHRISTMANN

BY John A. Seifert

ATTORNEY

LOW CAPACITY WEIGHER AND FEEDER

The advantages of the present invention over belt feeders and screw feeders are:

On belt feeders, the belt speed becomes very low for low capacities and the discharge of material at the head pulley of the belt is intermittent and the same holds true of screw feeders as far as the discharge of material is concerned.

Whereas in using a rotating drum, the discharge of material is continuous, and depending on the angle of declination and the speed of rotation of the drum, there is a heavier load in the drum than on a belt of corresponding length since the material progresses slowly through the drum.

In a rotating drum, there is no belt tension nor varying belt weight to adversely influence the weighing, nor is there any belt tracking problems and no static is generated in the drum as it is on belts.

The method of loading or transfering the material into the drum over the fulcrum of the beam and transferring the material through a rotating vane without impact on the drum prevents any adverse effect on weighing the material.

The accurate weighing of material at low rates is difficult on account of the adverse influence of belt rigidity and belt tension on the light load carried. These factors vary with the load, temperature and speed and are difficult to eliminate. On the present drum feeder these factors are not present.

The present invention comprises a screw conveyor receiving machine from a hopper and inclining from the hopper to a rotating drum supported by a beam fulcrumed at the point the material is discharged from the screw conveyor to the drum. The drum declines from the screw conveyor at an obtuse angle and discharges and the material at its lower end. The screw conveyor and the drum are rotated by separate variable speed motors regulated by a strain gauge actuated by the beam and a pulser wheel rotated by the drum motor relative to a pick coil.

Applicant at the time of filing this application had no knowledge of the prior art pertaining to his invention.

Figure 2:
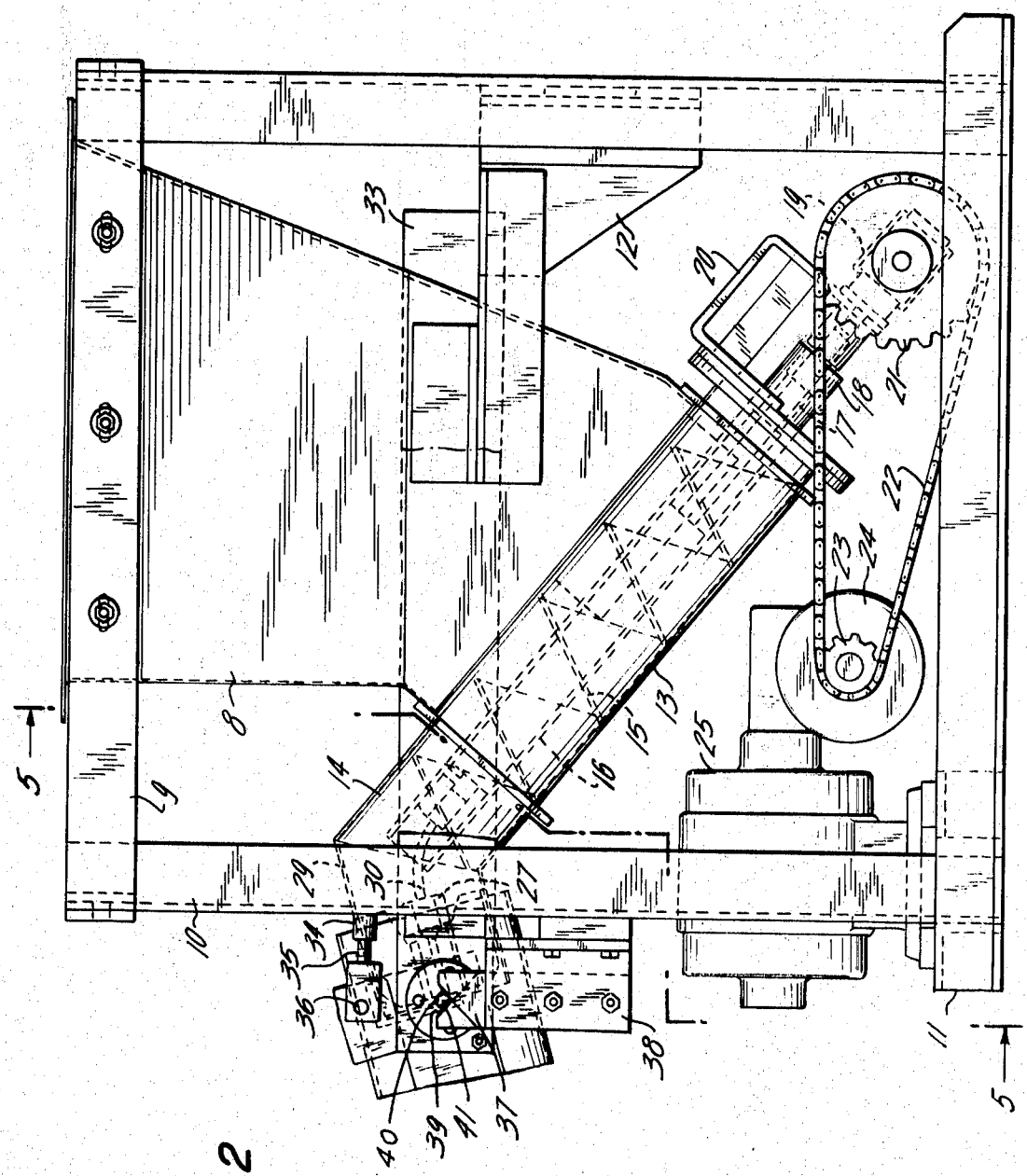
FIG. 2 is a side elevational view of the screw prefeeder.

The embodiment of this invention comprises a hopper or bin 8 suspended from the top members 9 of a framework 10 mounted on base 11, as shown in FIG. 2. An intermediate portion of the bin 8 is supported from the framework 10 by a bracket 12. The lower or discharge portion of the bin 8 is rectangular and extended in an oblique plane with the bottom open and provided with a saddle-shaped strap 13 supporting a cylindrical casing 14 having a portion of the upper periphery cutout corresponding to the open bottom of the bin 8 to receive material from said bin. A screw conveyor is mounted on the casing 14 in the form of a helix 15 on a tubular shaft 16 having its lower end secured to a solid shaft 17 rotatably supported in a bearing 18 secured to the lower end of the casing 14. The outer end of the shaft 17 is connected to miter-gearing 19 supported by a bracket 20 secured to the bearing 18, as shown in FIG. 2. The miter-gearing 19 is connected to a sprocket wheel 21 engaged by a sprocket chain 22 engaging a sprocket wheel 23 on the output shaft of reduction gearing 24 of a variable speed electric motor 25 mounted on the base 11.

Figure 7:
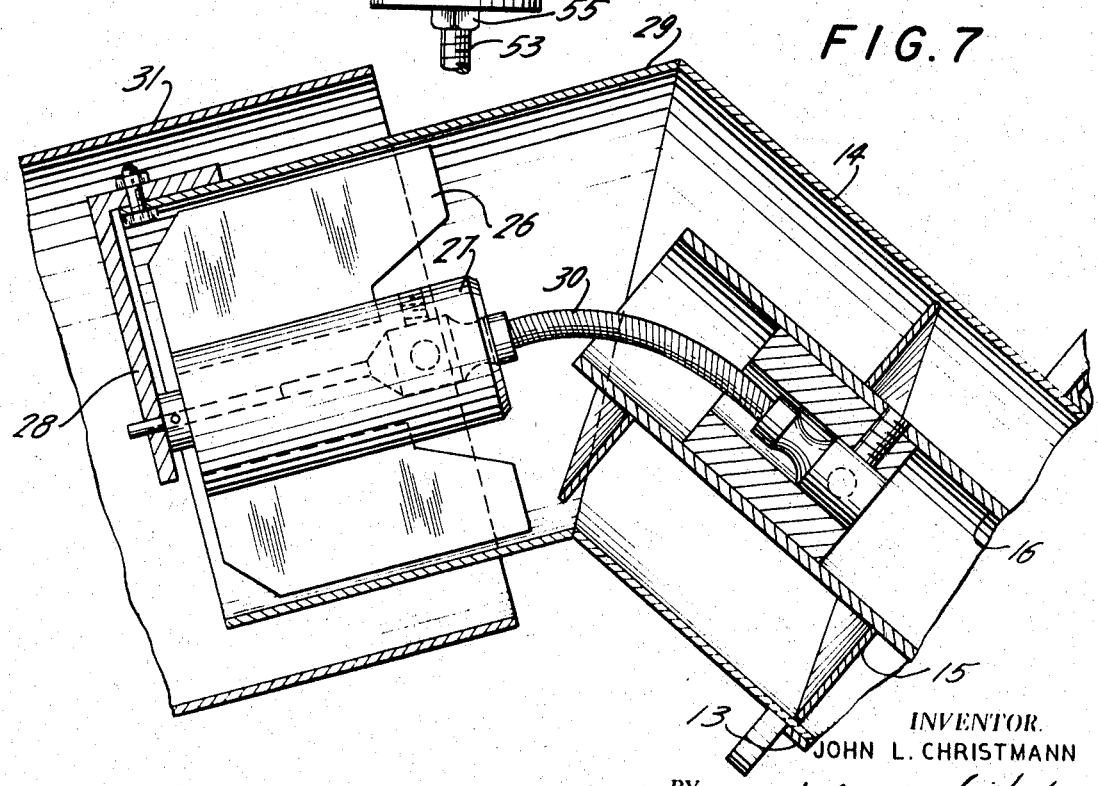
FIG. 7 is an enlarged sectional view of the point of material transfer between the prefeeder and the rotating drum.

To make the intermittent discharge of material from the casing 14 more uniform, vanes 26 are secured in a hub 27 rotatably supported by a bracket 28 mounted on an end portion 29 extended in a downwardly direction from the main body of the casing 14 at an obtuse angle. The hub 27 is rotated by the shaft 16 of the screw conveyor through a flexible shaft 30 secured at its ends to the shaft 16 and the hub 27, as shown in FIG. 7.

Figure 3:
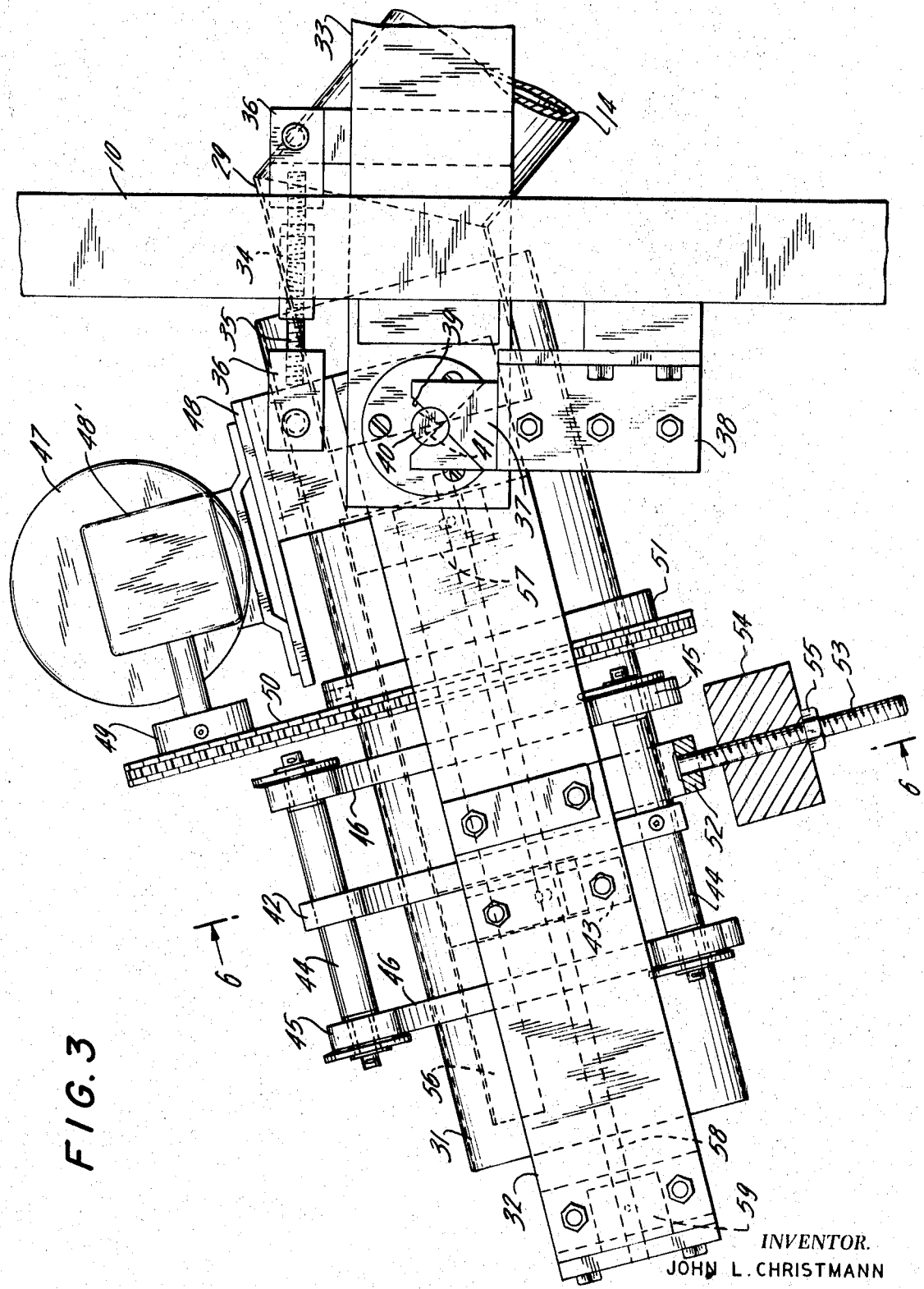
FIG. 3 is a side elevational view of the rotating drum.
Figure 4:
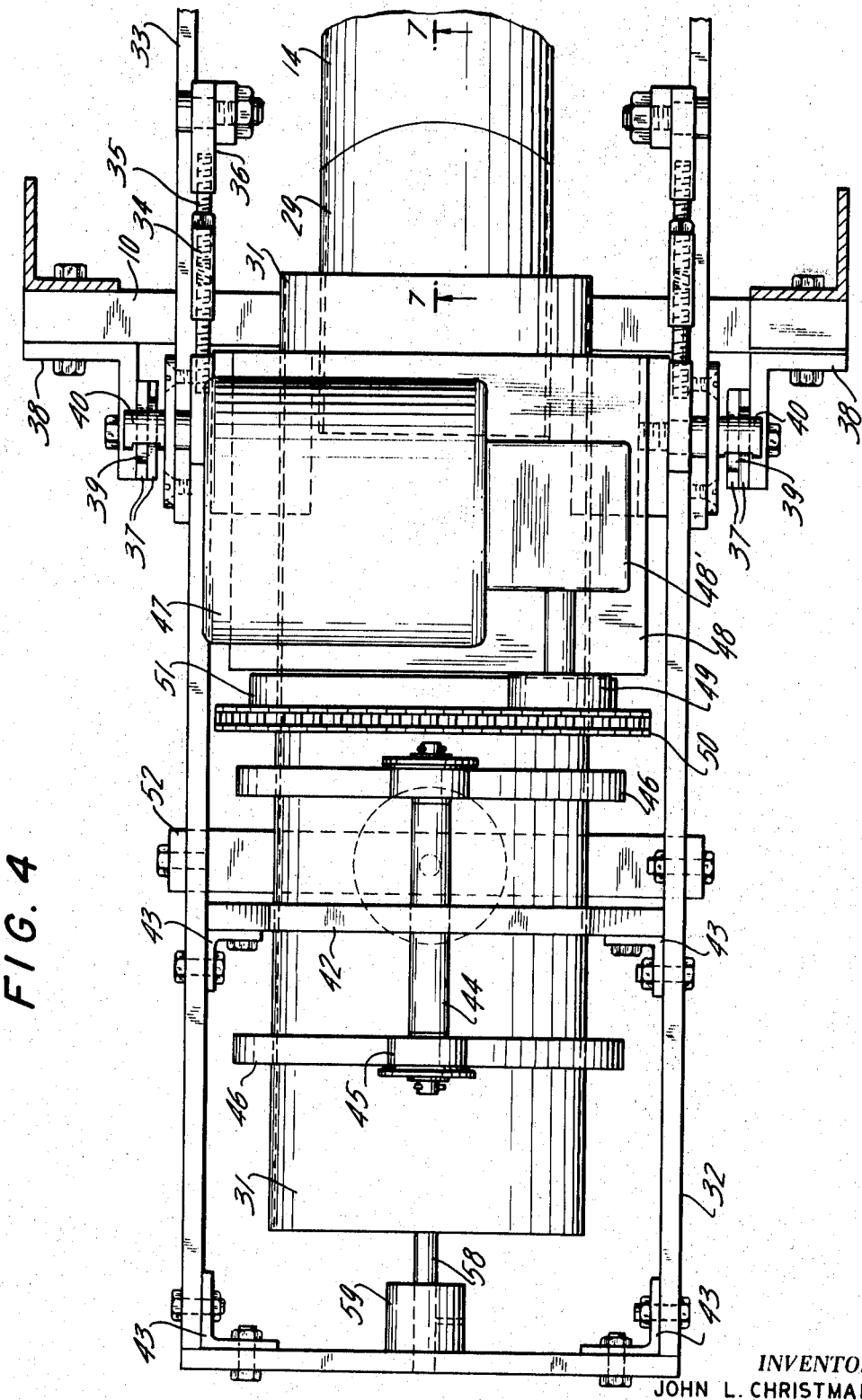
FIG. 4 is a top plan view of the rotating drum.

The material is discharged from the end portion 29 of the screw conveyor into a drum 31 of larger diameter with the material receiving end portion of the drum 31 encircling the end portion 29 of the screw conveyor. The drum 31 is rotatably supported by a beam comprising a first part consisting of a U-shaped frame 32 and a second part consisting of a pair of counterbalance arms 33 connected together by a pair of links, each link consisting of turnbuckle 34 and a pair of screws 35 threaded in sockets 36 pivotally mounted on the side members of the U-shaped frame 32 and on the arms 33, as shown in FIGS. 3 and 4. The adjacent end portions of the frame 32 and the arms 33 are fulcrumed at the point of material transfer between the screw conveyor 14—16 and the drum 31 by a pi pair of fulcrum brackets, each bracket consisting of two overlapped plates 37 mounted on a bracket 38 secured to the framework 10 and the upper end portions of the plates 37 being beveled to form a sharp V-shaped notch 39, as shown in FIGS. 2 and 3, A pin 40 having a V-shaped edge 41 is secured in each side member of the frame 32 and each arm 33 and extended from the arms 33 with the edges 41 engaged in the notches 39.

The drum is rotatably supported in the frame 32 by a roller cage comprising a U-shaped bracket 42 having the leg portions secured to the side members of the frame 32 by angle-pieces 43. Center portions of shafts 44 are secured in spaced portions of the bracket 42 with the opposite ends of each shaft 44 rotatably supporting wheels 45 engaging rings 46 secured to and encircling the drum 31. The drum 31 is rotated by a variable speed electric motor 47 supported by a platform 48 mounted on the side members of the frame 32 at the fulcrum pins 40. The motor 47 is provided with reduction gearing 48' having an output shaft arranged with a sprocket wheel 49 engaged by a sprocket chain 50 engaging a sprocket ring 51 secured on and encircling the drum 31.

The frame 32 is provided with an adjustable counterbalance weight comprising U-shaped bracket 52 having the leg portions secured to the side members of the frame 32 and a cross or connecting portion is provided with a depending screwthreaded stem 53 for the mounting of a weight 54 retained in adjusted position of the stem 53 by a nut 55 threaded on said stem, as shown in FIG. 3.

Figure 6:
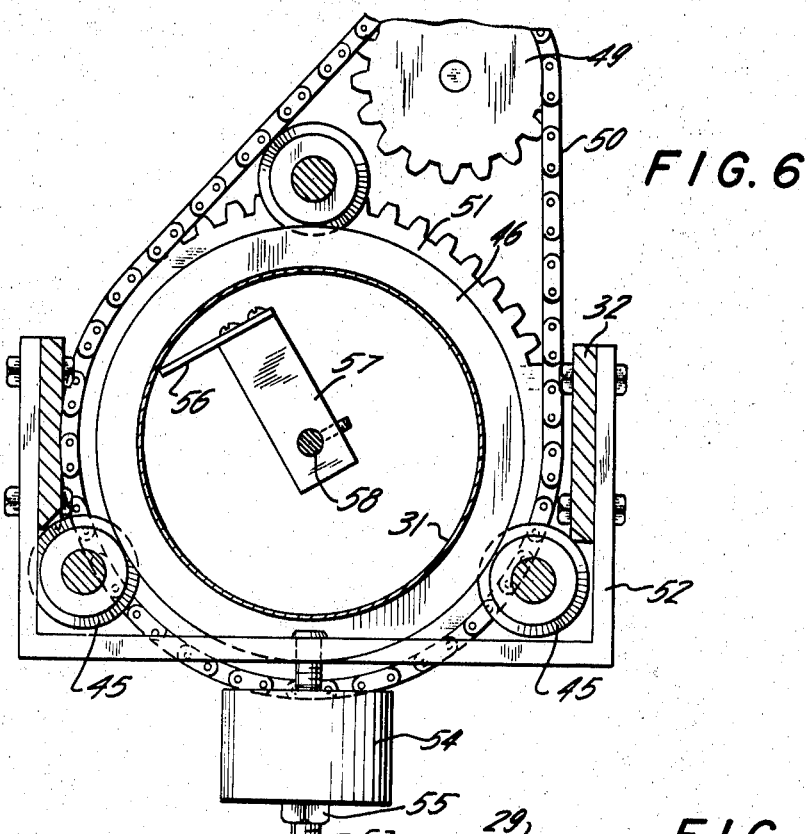
FIG. 6 is a cross-sectional view of the rotating drum taken on the line 6—6 of FIG. 3 looking in the direction of the arrows.

To prevent any material buildup in the drum 31, there is provided a scraper blade 56 mounted on brackets 57 secured to a shaft 58 having one end fixedly supported by the end member of the frame 32, as shown at 59 in FIGS. 3, 4 and 6.

The beam arms 33 extend on both sides of the screw conveyor 14—16 and the discharge portion of the bin 8, and the vertical movements of the ends of said arms opposite the fulcrumed ends are limited by stops 60 adjustably mounted on a rod 61 supported in the bracket 12 to engage one of the arms 33.

Figure 5:
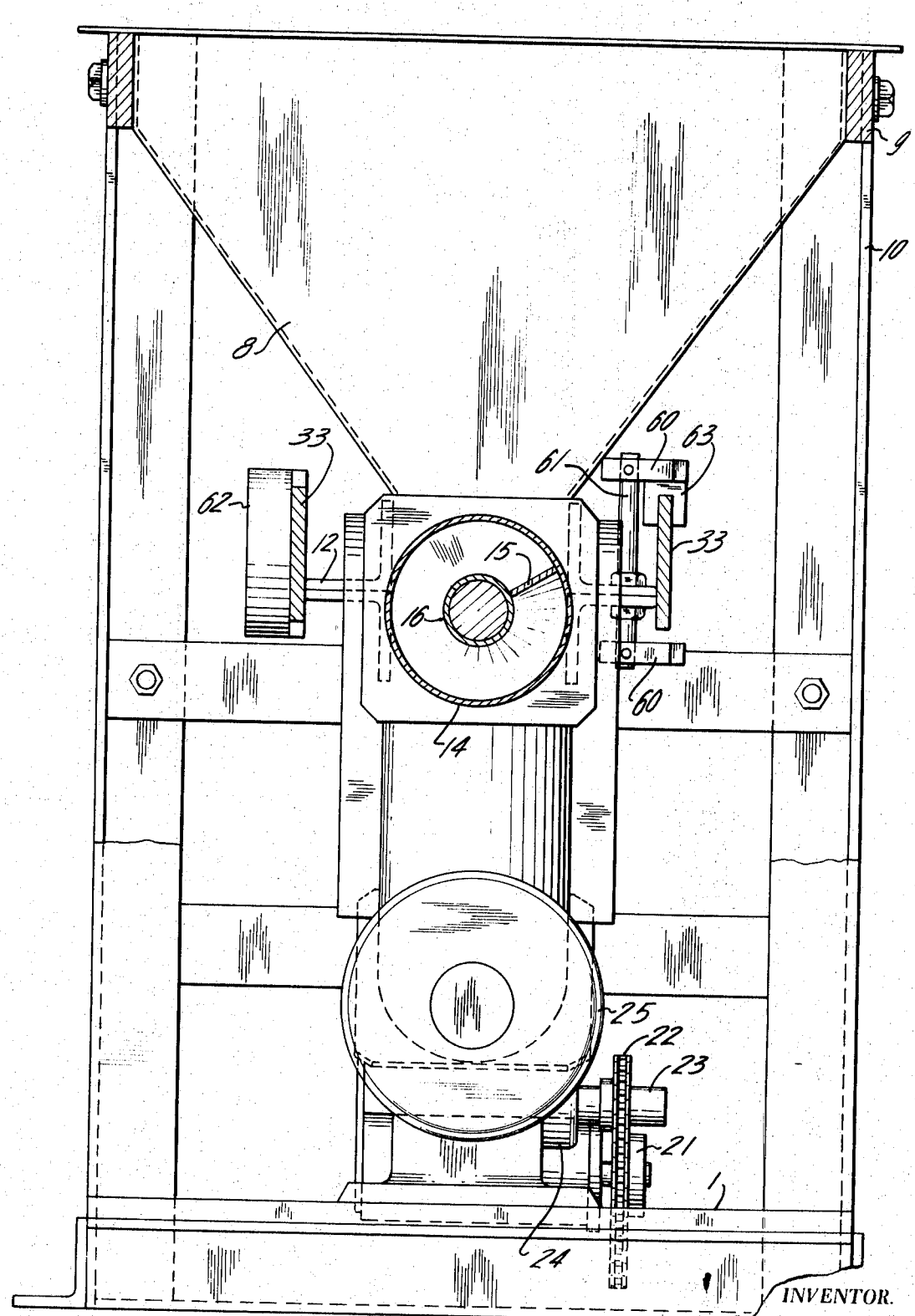
FIG. 5 is a cross-sectional view of the prefeeding taken on the line 5—5 of FIG. 2 looking in the direction of the arrows.

The beam consisting of the drum 31, the frame 32 and the arms 33 are counterbalanced by a counterbalance weight 62 on the arm 33 opposite the arm 33 limited by the stops 60, as shown in FIG. 5.

For fine balancing of the beam, the arm 33 limited by the stops 60 is provided with a weight 63 mounted on said arm to be adjusted longitudinally of the arm, as shown in FIG. 5.

Figure 1:
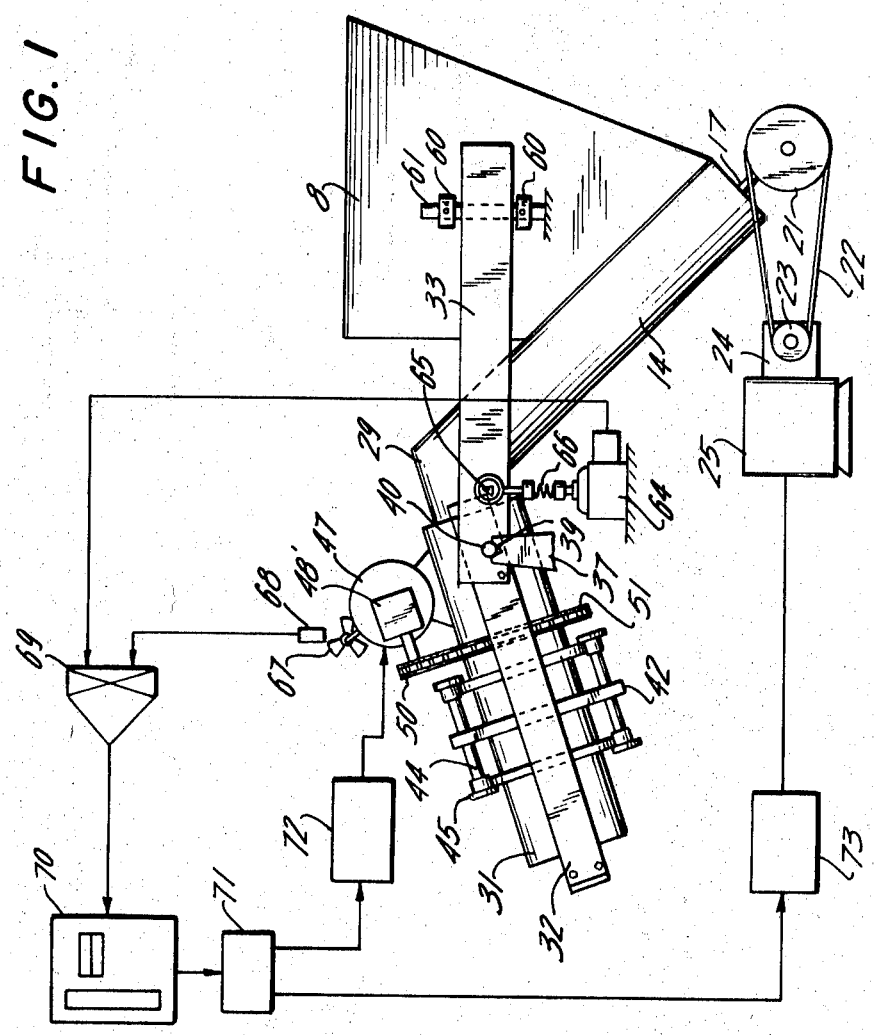
FIG. 1 is a schematic view of the inclining screw prefeeder, rotating drum and a beam coupled with an electrical circuit for controlling the rotation of the prefeeder and the drum.

When material density varies considerably, a low capacity strain gauge or load cell 64 is provided, as shown in FIG. 1. Said cell may be mounted on the base 11 and connected to one of the arms 33 through a knife-edge connection 65. The very delicate load cell 64 is protected from damage by limiting the arm deflection by the stops 60 and by interposing a spring 66 between the arm 33 and the cell 64, as shown in FIG. 1. Since a slight drum deflection does not affect the accuracy, the spring 66 and the stops 60 will absorb shocks and overloads.

The load in the drum 31 is maintained by constant by varying the speed of the motors 25 and 47 to maintain the desired preset rate of material feed. By this means, the transportation lag in the drum 31 does not influence the accuracy since the amount of material discharged from the drum 31 reflects immediately any change in the speed of rotation of the drum 31.

This is accomplished by the load signal from the cell 64 being multiplied with the pulses of a pulser wheel 67 rotated by the motor 47 and picked up by a coil 68 electrically connected to a pulse frequency amplitude modulating multiplier 69 which is also electrically connected to the load cell 64, as indicated in FIG. 1. The output signal of the multiplier 69 is compared with the preset voltage of a set point controller 70 having its output electrically connected to a dual output current amplifier 71 having one output connected to a SCR speed control 72 electrically connected to the motor 47 to maintain the desired speed of rotation of the drum 31 and the rate of material feed. The other output of the amplifier 71 is electrically connected to another SCR speed control 73 electrically connected to the screw conveyor motor 25 to adjust the speed of said motor and maintain a certain speed ratio with the drum motor 47.

Integration can also be accomplished through the pulse frequency amplitude modulating multiplier 69.

I claim:

1. In a low capacity material weigher and feeder, a screw conveyor having a material inlet and outlet, a beam fulcrumed at the material outlet of the screw conveyor, and a drum rotatably supported by and extended in the horizontal plane of the beam and one end communicating with the material outlet of the screw conveyor.

2. In a low capacity material, weigher and feeder as claimed in claim 1, two variable motive means, one being connected to the screw conveyor and the other being connected to the drum.

3. A low capacity material weigher and feeder as claimed in claim 1, wherein the beam is fulcrumed intermediate the ends thereof with the end of the drum communicating with the material outlet of the screw conveyor extended beyond the fulcrum in the direction of the screw conveyor.

4. A low capacity material weigher and feeder as claimed in claim 1, wherein the beam comprises two parts, the first part rotatably supporting the drum, and the second part extending in the direction of the screw conveyor, both parts being connected together and fulcrumed at the same point.

5. In a low capacity material weigher and feeder as claimed in claim 4, motive means supported by the first part of the beam and operatively connected to the drum to rotate the same.

6. In a low capacity material weigher and feeder as claimed in claim 4, counterbalance weights mounted on the first and second parts of the beam to maintain the center of gravity of the beam and the drum a small distance below the fulcrum of the beam.

7. In a low capacity material weigher and feeder as claimed in claim 4, a strain gauge connected to the second part of the beam, a pulser wheel actuated by the rotation of the drum, an electric coil receiving electric pulses from the pulser wheel, means electrically connected to the strain gauge and the electric coil and arranged to control the speed of rotation of the screw conveyor and the drum.

8. In a low capacity material weigher and feeder as claimed in claim 2, a strain gauge connected to the beam on one side of the beam fulcrum, a pulser wheel driven by the motive means connected to the drum, an electric coil receiving electric pulses from the pulser wheel, and means electrically connected to the strain gauge, the electric coil and the two motive means and arranged to control the speed of said motive means and the speed of rotation of the screw conveyor and the drum.

9. In a low capacity material weigher and feeder as claimed in claim 1, vanes rotatably supported in the outlet of the screw conveyor and operatively connected to the screw conveyor to rotate therewith and produce a uniform discharge of material.

10. A low capacity material weigher and feeder as claimed in claim 1, wherein the screw conveyor and the drum extend in declining planes from each other.

11. In a low capacity material weigher and feeder as claimed in claim 7 stops adjustably mounted above and below the second part of the beam to limit the beam deflection and protect the strain gauge from damage.

12. In a low capacity material weigher and feeder as claimed in claim 7, a spring interposed between the strain gauge and the second part of the beam to protect the strain gauge from damage.

13. In a low capacity material weigher and feeder as claimed in claim 1, a scraper blade fixedly supported by the drum and positioned in the drum to scrape the interior of the drum and prevent material build up in the drum.

14. A low capacity material weigher and feeder as claimed in claim 1, wherein the drum is rotatably supported by the beam by providing rings secured to and encircling the drum, and wheels rotatably supported by the beam to ride on the rings.